United States Patent [19]

Teng et al.

[11] Patent Number: 5,408,750
[45] Date of Patent: Apr. 25, 1995

[54] X-Y TABLE APPARATUS

[75] Inventors: Hongchun Teng; Wataru Ishibashi, both of Kawasaki, Japan

[73] Assignee: Mitutoyo Corporation, Tokyo, Japan

[21] Appl. No.: 146,160

[22] PCT Filed: Apr. 1, 1993

[86] PCT No.: PCT/JP93/00420

§ 371 Date: Nov. 29, 1993

§ 102(e) Date: Nov. 29, 1993

[87] PCT Pub. No.: WO93/21639

PCT Pub. Date: Oct. 28, 1993

[30] Foreign Application Priority Data

Apr. 9, 1992 [JP] Japan .................. 4-30458 U
Jan. 18, 1993 [JP] Japan .................. 5-4034 U

[51] Int. Cl.⁶ .................. B23Q 16/00; G01B 5/00
[52] U.S. Cl. .................. 33/1 M; 33/568; 33/DIG. 3; 108/137; 108/143; 248/913; 269/71
[58] Field of Search .................. 33/1 M, 549, 568, 569, 33/573, DIG. 3; 108/137, 143; 248/913, 178, 184, 185; 269/71, 73

[56] References Cited

U.S. PATENT DOCUMENTS

| | | | |
|---|---|---|---|
| 4,575,942 | 3/1986 | Moriyama | 33/1 M |
| 4,676,649 | 6/1987 | Phillips | 33/1 M |
| 4,953,965 | 9/1990 | Iwase et al. | 108/143 |
| 5,065,092 | 11/1991 | Sigler | 33/1 M |
| 5,123,174 | 6/1992 | Noguchi | 33/568 |
| 5,142,791 | 9/1992 | Kobayashi et al. | 33/1 M |

FOREIGN PATENT DOCUMENTS

1-291101 11/1989 Japan .
1-291194 11/1989 Japan .

OTHER PUBLICATIONS

John T. Winthrop et al.; "Theory of Fresnel Images. I. Plane Periodic Objects in Monochromatic Light"; *Journal of the Optical Society of America*, vol. 55, No. 4; Apr. 1965; pp. 373–381.

*Primary Examiner*—Christopher Fulton
*Attorney, Agent, or Firm*—Oliff & Berridge

[57] ABSTRACT

An X-Y table apparatus comprises a base (12), an X-directional moving member (14) movable in the X direction with respect to the base, a mounting member (18) movable in the Y-direction with respect to the X-directional moving member and being capable of loading articles and displacement detecting member (20) for detecting displacements of the mounting member with respect to the base. The displacement detecting member includes a main scale (24) cooperatively provided on the center of the rear face of the mounting member and having a first matrix-shaped land lattice, and an index scale (26) provided in parallel with the base so as to be movable in directions in a two-dimensional area with respect to the main scale and having a first orthogonally cross lattice (80) and a second orthogonally cross lattice (82), such that the displacement detecting member has a simple structure and effects accurate X-directional displacement and Y-directional displacement detection. A block (100) integrally fixed to the mounting member (18) is formed with a mounting hole (101). The distal end portion (102) of the detecting shaft (22) is inserted in the mounting hole and is supported by three lines formed by three parallel pins (103a to 103c). Under the mounting member, the detecting shaft is provided to be rotated by an adjusting lever (105) so as to finely adjust the relative rotational angular position between the table and the X-Y encoder.

6 Claims, 7 Drawing Sheets

X-Y TABLE APPARATUS

FIELD OF THE ART

The present invention relates to an X-Y table apparatus which moves articles to be loaded in an X-Y plane with respect to a base, and more particular to an X-Y table apparatus provided with an X-Y encoder for being capable of accurately detecting displacements in two-dimensional directions.

Background of the Art

X-Y tables each for setting an article to be loaded, such as a work to be measured or machined, at a required position are widely used in various machines such as measuring machines, tool machines and the like.

In general, the X-Y table of this type is provided with a stable base, an X-directional moving member movable in the X-direction with respect to the base, and a Y-directional moving member (or a mounting member) movable in the Y-direction with respect to the X-directional moving member. To detect displacements, in the X direction and Y direction, of an article loaded on the mounting member, linear encoders for detecting the displacements are provided on the adjacent two sides (directed in the X direction and the Y direction, respectively) of the mounting member.

In the conventional X-Y table of general type, however, the linear encoders must be fixed to the outer surfaces of the mounting member. This renders the outer dimensions of the apparatus large. Further, protecting covers are required for protecting the encoders, which are extremely precise equipment, from dust and/or external shocks, because otherwise the encoders are exposed to the outer atmosphere. Two separate encoders must be used for the two axes, leading to a high manufacturing cost and requiring complicated wiring. Further, the article on the mounting member is displaced from the linear encoders. Thus, there has been a problem that a small distortion and/or play of the table directly gives adverse effects to the measuring accuracies.

Disclosure of the Invention

The present invention was made to solve the problems of the prior art and its object is to provide an X-Y table which has a simple and small structure and provides improved measuring accuracies.

First, in order to achieve the object, the present invention provides an X-Y table characterized by comprising a base, an X-directional moving member which is movable in the X direction with respect to the base, a mounting member which is movable in the Y direction with respect to the X-directional moving member and on which an article is loaded, and displacement detecting means for detecting displacements of the mounting member with respect to the base, the displacement detecting means including a main scale having a first matrix-shaped land lattice cooperatively provided on the center of the rear face of the mounting member and an index scale provided in parallel with the base so as to be movable in two-dimensional directions with respect to the main scale and having an orthogonally crossing second lattice and an orthogonally crossing third lattice.

Secondly, the present invention is to provide an X-Y table characterized in that the first lattice comprises a reflection type land lattice, the orthogonally crossing second lattice of transparent type is provided on the central portion of the index scale, the third lattice of transparent type is provided on the outer peripheral portion of the second lattice, a light emitting element is provided on the rear face of the orthogonally crossing second lattice of transparent type, and light receiving elements are provided on the rear face of the third lattice of transparent type.

With the X-Y table according to the present invention, the displacements of the mounting member (loaded article) in the X and Y directions are detected by a single displacement detecting means, leading to the miniaturization and a low manufacturing cost of the table. Further, as the displacement detecting means can be disposed substantially on the central portion of the mounting member, the measuring accuracies can be improved.

The X-Y encoder which is now being considered has a main scale and an index scale disposed opposed to each other such that they are constructed to measure the displacements in two-dimensional directions. One of the scales is fixed to the base and the other movable scale is connected by a detecting shaft fixed to a fixing hole formed in the mounting member. If the X-Y encoder and the table are not positioned at high accuracies in this case, there occurs a problem that the X-Y encoder outputs a displacement in a Y direction even though the table is moved, for example, only in an X direction. This problem does not occur when encoders are arranged along X and Y directions, respectively.

It is accordingly the other object of the present invention to provide an X-Y table apparatus having a mechanism for effecting precisely relative positioning between the X-Y encoder and the table member.

Thirdly, an X-Y table apparatus according to the present invention is characterized by comprising a base, a first axial moving member provided movably in first axial direction in a two-dimensional area with respect to the base, a mounting member provided movably in second axial direction in the two-dimensional area, for loading an article to be loaded, an X-Y encoder having a solid cylindrical or hollow cylindrical detecting shaft connected to a mounting hole formed in the mounting member, and a main scale and an index scale disposed opposed to each other, one of the main and index scales being fixed to the base, for detecting displacements of the mounting member in the first and second directions simultaneously, and adjusting means comprising three parallel pins provided in the mounting hole of the mounting member so as to partially project from the inner peripheral wall of the mounting hole, the three parallel pins defining three lines for supporting the detecting shaft, and a lever rotating the detecting shaft, for adjusting a relative rotational angular position between the mounting member and the X-Y encoder.

According to the present invention, the adjusting means comprising three parallel pins provided in the mounting hole of the mounting member so as to partially project from the inner peripheral wall of the mounting hole, the three parallel pins defining three lines for supporting the detecting shaft, and a lever rotating the detecting shaft, for adjusting a relative rotational angular position between the mounting member and the X-Y encoder, can realize a relative positioning easily at a high accuracy.

EMBODIMENT

The preferable embodiments of the present invention will now be described with reference to the drawings.

Figure 1:
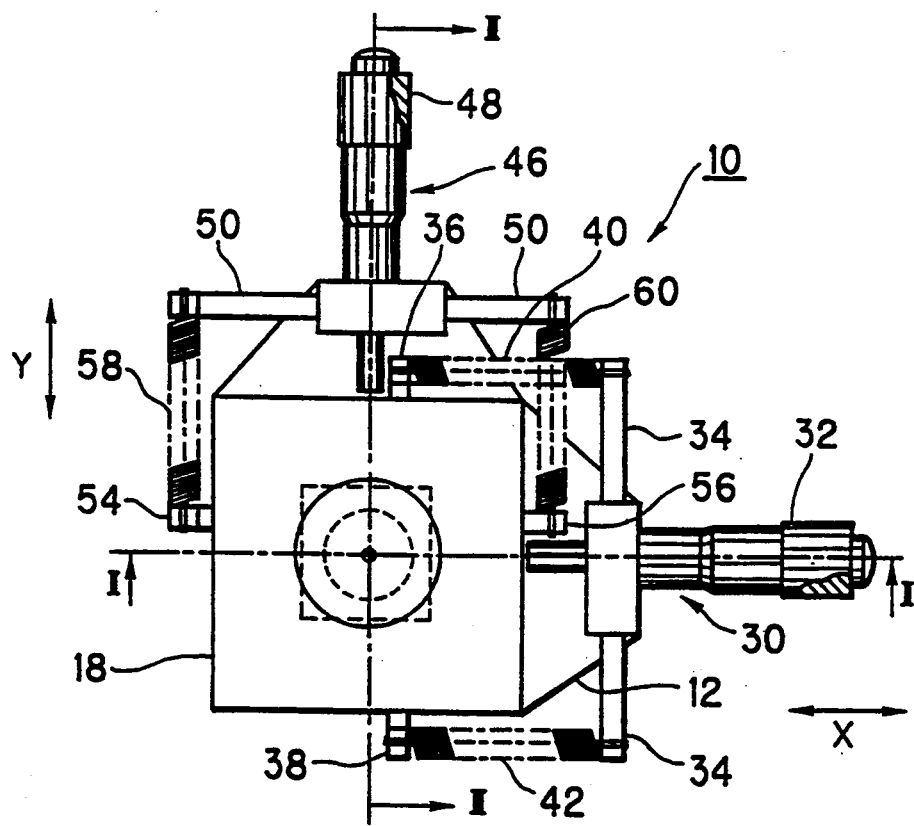
FIG. 1 is a plan view of a general structure of an X-Y table according to an embodiment of the present invention.
Figure 2:
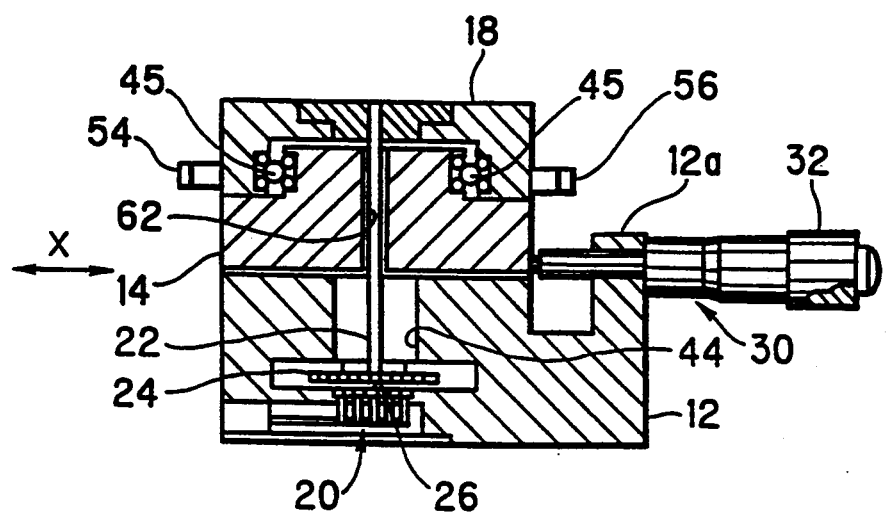
FIG. 2 is a cross-sectional view of the table along line II—II of FIG. 1.
Figure 3:
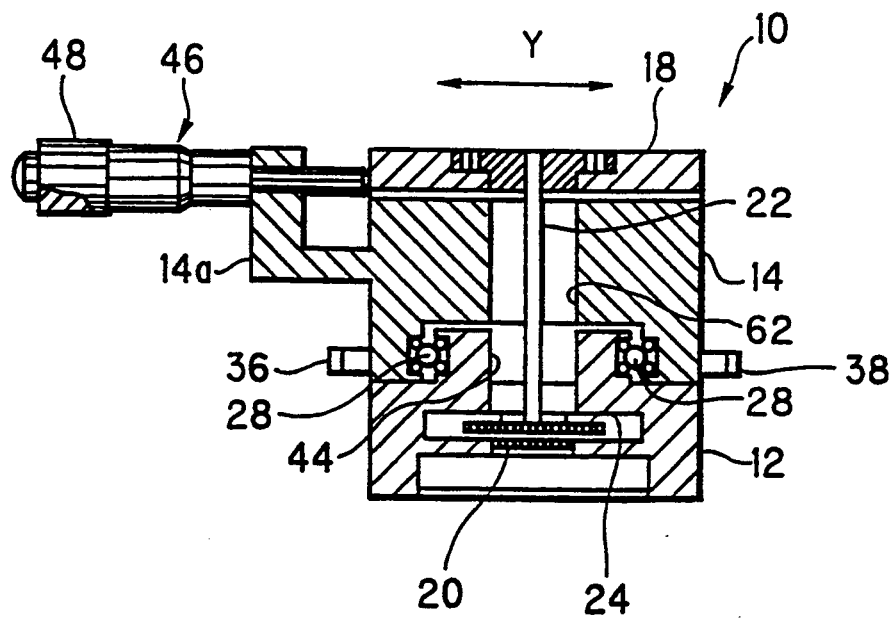
FIG. 3 is a cross-sectional view of the table along line III—III of FIG. 1.

FIG. 1 is a plan view of the fundamental structure of an X-Y table according to one embodiment of the present invention, FIG. 2 is a cross-sectional view along line II—II of FIG. 1, and FIG. 3 is a cross-sectional view along line III—III of FIG. 1.

In these figures, an X-Y table 10 comprises a base 12, an X-directional moving member 14 provided on the base 12 so as to be movable in the direction shown by an arrow X, a mounting member (Y-directional moving member) 18 provided so as to be movable with respect to the X-directional moving member 14 in the direction shown by an arrow Y, and displacement detecting means (an X-Y encoder) 20 for detecting displacements of the mounting member 18 with respect to the base 12 in the X and Y directions. The displacement detecting means 20 includes a main scale 24 and an index scale 26 disposed opposed to each other.

A detecting shaft 22 extends downward from the mounting member 18, and the main scale 24 is provided on the lower end of the detecting shaft 22. The index scale 26 is provided in the base 12 so as to correspond to the main scale 24. The displacements of the mounting member 18 in the X and Y directions are detected by the relative movement between the main scale 24 and the index scale 26.

The X-directional moving member 14 is supported on the base 12 by means of rollers 28 (see FIG. 3). When the distal end of a micrometer head 30 fixed to the micrometer head supporting portion 12a of the base 12 is made to advance by rotating the knob 32 of the micrometer head 30, the mounting member 18 can be pushed to be moved in an X direction (to the left side in FIG. 2) against the base 12. Tension springs 40 and 42 are stretched between arms 34 extending outward from both sides of the head supporting portion 12a and engaging portions 36 and 38. When the distal end of the head 30 is retracted by the reverse rotation of the knob 32, the X-directional moving member 14 is moved in an X direction (to the right side in the figure) by the tension of the tension springs 40 and 42. A circular opening 44 is formed in the central portion of the base 12. Since the detecting shaft 22 passes through the opening 44, the detecting shaft 22 does not restrict the movement of the X-directional moving member 14 in the X direction.

The mounting member 18 is supported on the X-directional moving member 14 by means of rollers 45. When the distal end of a micrometer head 46 fixed to the micrometer supporting portion 14a of the X-directional moving member 14 is made to advance by rotating the knob 48 of the micrometer head 46, the mounting member 18 is pushed to be moved in a Y direction (to the right side in FIG. 3). Tension springs 58 and 60 are stretched between arms 50 extending outward from both sides of the head supporting portion 14a and engaging portions 54 and 56 on both sides of the mounting member 18. When the distal end of the head 46 is retracted by the reverse rotation of the knob 48, the mounting member 18 is moved in a Y direction (to the left side in FIG. 3). An elongated hole 62 extending in the Y direction is formed in the central portion of the X-directional moving member 14. Since the detecting shaft 22 passes through the elongated hole 62, the detecting shaft 22 does not restrict the movement of the mounting member 18 in the Y direction.

As described above, with the X-Y table according to this embodiment, the mounting member 18 can be moved in the X and Y directions by required distances by rotating the knobs 32 and 48 of the micrometer heads 30 and 46, respectively.

Figure 4:
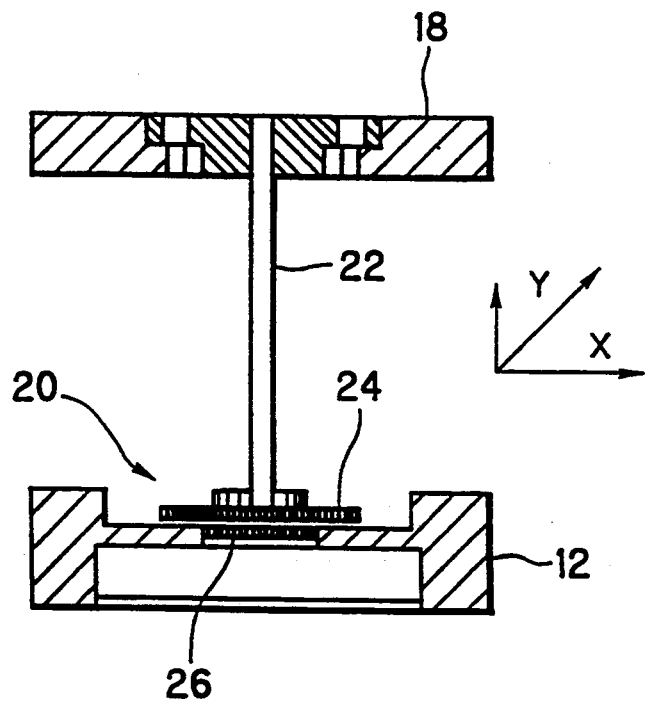
FIG. 4 is a view illustrating the structure of the displacement detecting portion of the table of the embodiment shown in FIG. 1.

In the present invention, the displacements of the mounting member 18 with respect to the base 12 is detected by a single displacement detecting means 20. In order to do so, a photoelectric encoder 20 is used as the displacement detecting means. More specifically, as clearly seen from a simplified view of FIG. 4, the detecting shaft 22 extends downward from the mounting member 18 to the base 12 such that the relative displacement between the main scale 24 provided on the distal end portion of the detecting shaft 22 and the index scale 26 fixed to the base 12 is detected.

Figure 5:
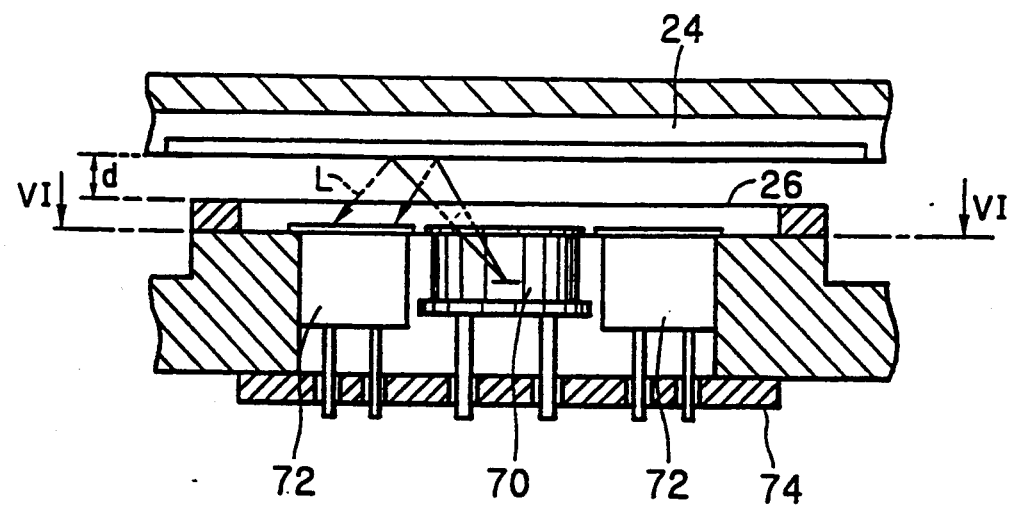
FIG. 5 is a view illustrating a general structure of a photoelectric encoder used in the embodiment shown in FIG. 1.
Figure 6:
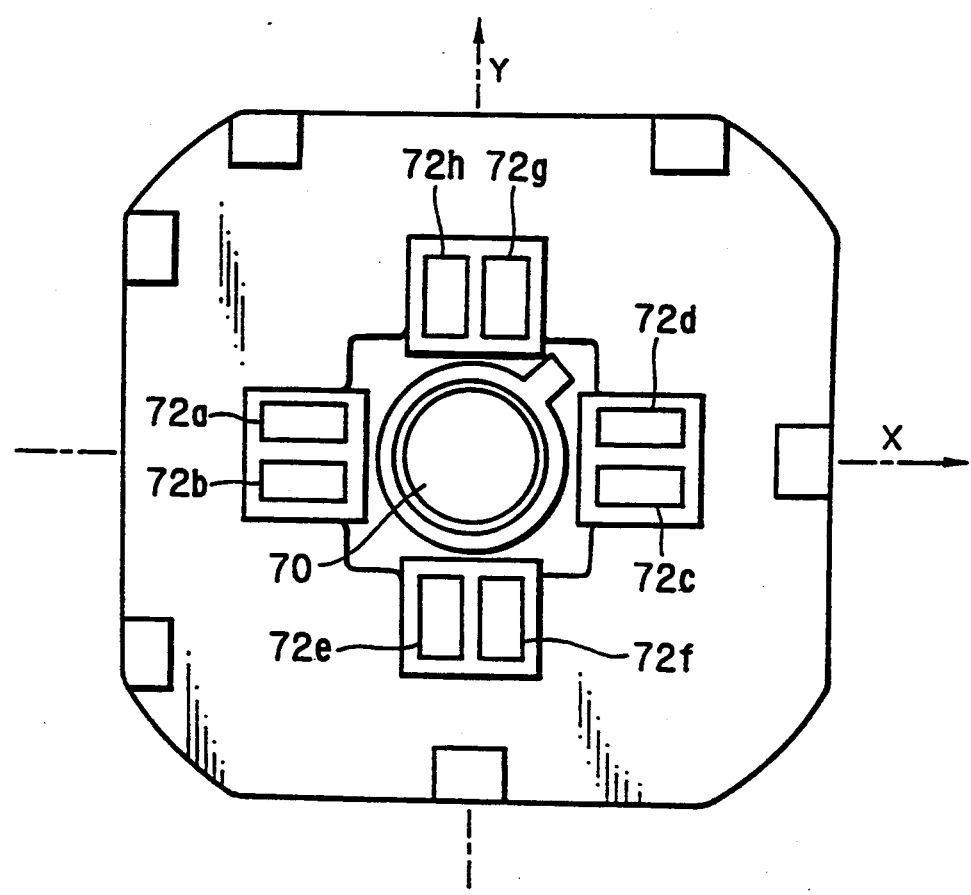
FIG. 6 is a view showing an arrangement of a light emitting element and light receiving elements of the photoelectric encoder relating to the above-mentioned embodiment.

FIG. 5 is an enlarged cross-sectional view of the photoelectric encoder 20, and FIG. 6 is a cross-sectional view along line VI—VI of FIG. 5. In these figures, on the undersurface of the index scale 26 in FIG. 5 are arranged a light emitting element 70 and eight light receiving elements 72a, 72b, 72h. The leads of the light emitting element 70 and the light receiving elements 72 are fixed to a printed substrate 74.

Figure 7:
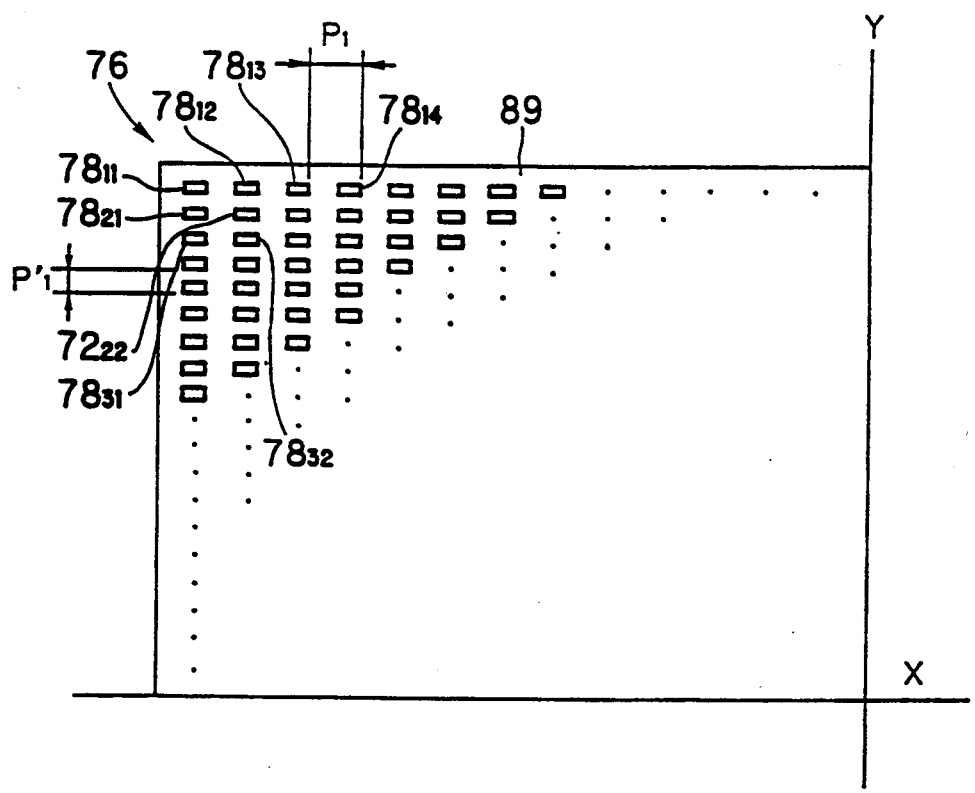
FIG. 7 is a view illustrating the main scale (first lattice) of the photoelectric encoder relating to the above-mentioned embodiment.

As shown in FIG. 7, a first lattice 76 is formed on the main scale 24. The first lattice 76 is a reflection type lattice which comprises rectangular land-shaped reflecting lattice portions $78_{11}$, $78_{12}$, —, $78_{1n}$; $78_{21}$, $78_{22}$—, $78_{2n}$; —; $78_{m1}$, $78_{m2}$, —$78_{mn}$ in the form of a matrix.

Arrays of the lattice portions 78 along the X axis (row) comprise a lattice parallel to the Y axis at a pitch of $P_1$, and arrays of the lattice portions 78 along the Y axis (column) comprise a lattice parallel to the X axis at a pitch of $P_1'$.

Figure 8:
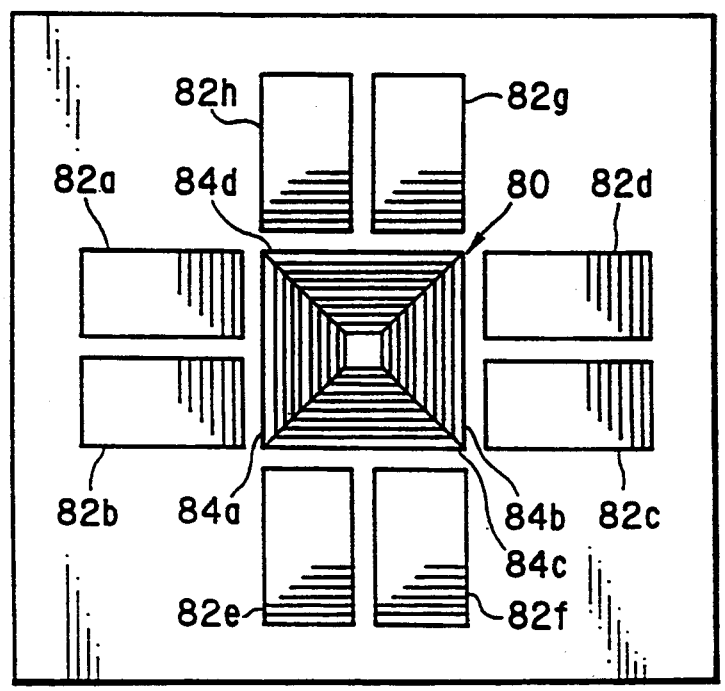
FIG. 8 is a view illustrating the index scale (second and third lattices) of the photoelectric encoder relating to the above-mentioned embodiment.

As seen from FIG. 8, the index scale 26 has a second lattice 80 and third lattices 82a, 82b, —, 82h. The second lattice 80 is a transparent lattice which comprises triangular transparent lattice portions 84a, 84b, —, 84d arranged in the X direction and the Y direction such that the rows of the transparent lattice portions cross the columns of the transparent lattice portions, corresponding to the emitting element 70. The third lattices 82a, 82b, —, 82h corresponding to the light receiving elements 72a, 72b, —, 72h are arranged in the X direction and the Y direction so as to cross each other.

Light L emitted from the light emitting element 70 is reflected by the first lattice 76 through the second lattice portions 84a, 84b, —, 84d. The reflected light is received by the light receiving elements 72a, 72b, —, 72h through the third lattices 82a, 82b, —, 82h.

With the photoelectric encoder according to this embodiment, as for detecting relative movements in the X direction, the second lattice portions 84a and 84b, the array in the row direction of the first lattice portions 78, the third lattice portions 82a, 82b, 82c and 82d and the light receiving elements 72a, 72b, 72c and 72d function as a three-lattice type displacement detector, respectively. And as for relative movements in the Y direction, the second lattice portions 84c and 84d, the array in the column direction of the first lattice portions 78 and the third lattice portions 82e, 82f, 82g and 82h function as a three-lattice type displacement detector, respectively.

Figure 9:
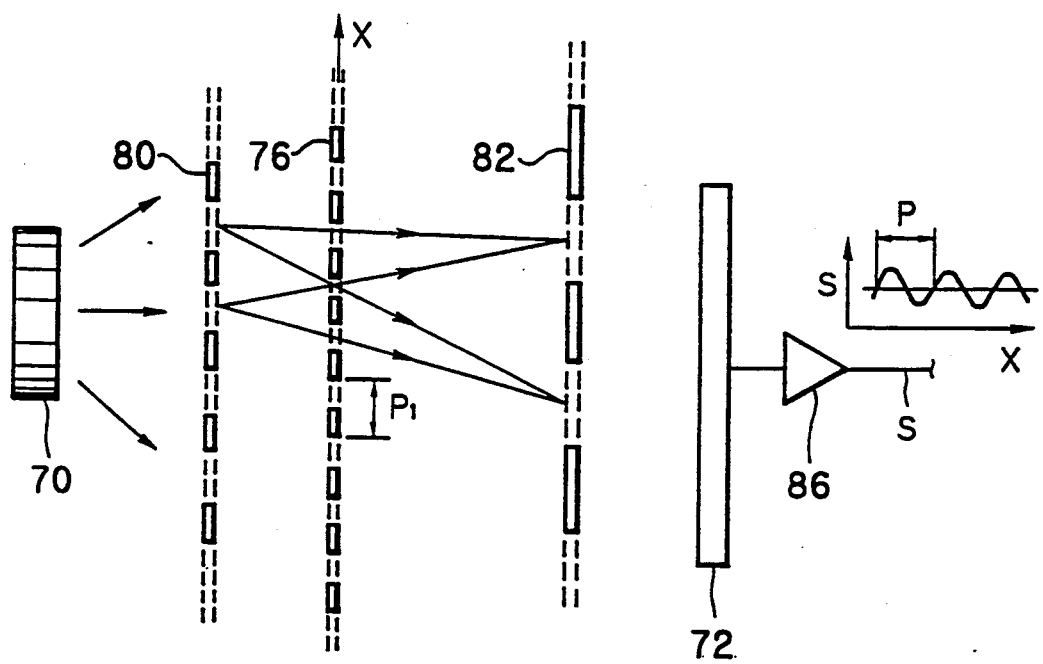
FIG. 9 is a view explaining the displacement detecting principle of the photoelectric encoder of the above-mentioned embodiment.

The principle of the three-lattice type displacement detector is shown in FIG. 9, wherein displacements are detected from variation of the degrees of overlapping of three lattices, as explained in Journal of the Optical Society of America, 1965, Vol. 55, No. 4, pages 373-381. The three-lattice type displacement detector 40 shown in FIG. 9 includes a second lattice 80 and a third lattice 82 arranged in parallel with each other, a first lattice 76 disposed between and in parallel with the second and third lattices 80 and 82 so as to be movable relative to them, a light emitting element 70 placed at the left side of the second lattice 80 in FIG. 9 and a light receiving element 72 disposed at the right side of the third lattice 82 in FIG. 9.

Light emitted from the light emitting element 70 arrives at the light receiving element 72 through the second lattice 80, the first lattice 76 and the third lattice 82. The illuminating light limited by the lattices 80, 76 and 82 is converted to an electrical signal and amplified by a preamplifier 86 so as to be output as detected signals s.

As, for example, the first lattice 76 moves relatively in the X direction with respect to the second lattice 80 and the third lattice 82, the amount of the illumination light from the light emitting element 70 shielded by the lattices 80, 76 and 82 gradually changes, and the resultant signals s are output in a substantially sinusoidal form. Since the pitch $P_1$ of the first lattice 76 corresponds to the wavelength P of the detected signals s, the relative movement of the reference lattice 76 is measured by the wavelength of the detected signals s and its divided value.

Based on the principle, by providing the first lattice 76 on the main scale 24 and by providing the second lattice 80 and the third lattice 82 on the index scale 26, the amounts of the relative movements of the scales 24 and 26, i.e., the amount of the relative movement between the mounting member 18 and the base 12 can be detected.

In this embodiment, those rows of the lattice portions 78 of the first lattice 76 which are arranged side by side in the X direction constitute a lattice which is parallel with the Y axis and has a pitch of $P_1$, and those columns of the lattice portions 78 which are arranged side by side in the Y direction constitute a lattice which is parallel with the X axis and has a pitch of $P_1'$. The lattice portions 84a and 84b of the second lattice 80 are formed with lattices each having a pitch of $P_2$ along the Y axis, and the lattice portions 84c and 84d are formed with lattices each having a pitch of $P_2'$ along the X axis.

The third lattices 82a, 82b, 82c and 82d form lattices for the Ax phase, the Ax' phase, the Bx phase and Bx' phase each having a pitch of $P_3$ in parallel with the Y axis, respectively. The third lattices 82e, 82f, 82g and 82h form lattices for Ay phase, Ay' phase, By phase and By' phase each having a pitch $P_3'$ in parallel with the X axis.

In view of this, assuming that Ax=0°, then against Ax

Ax'=180° (differing by ½ $P_3$)

Bx=90° (differing by ¼ $P_3$)

Bx'=270° (differing by ¾ $P_3$); and also assuming that Ay=0°, then against Ay

Ay'=180° (differing by ½ $P_3'$)

By=90° (differing by ¼ $P_3'$)

By'=270° (differing by ¾ $P_3'$).

The scales are formed accordingly.

As a result, Ax phase signals, Ax' phase signals, Bx phase signals and Bx' phase signals whose phases differ by $\pi/2$ one after another can be obtained from the light receiving elements 72a, 72b, 72c and 72d. An Ax phase output is obtained by differentially amplifying Ax and Ax' phases, and a Bx phase output can be obtained by differentially amplifying the Bx and Bx' phases. The directional sense of the relative movements of the scales along the X axis can be known by the sense of the displacement of the Ax phase and Bx phase outputs or the like. An electrical division of the detected signals provides a high resolving power detection of the displacement.

On the other hand, Ay phase, Ay' phase, By phase and By' phase signals whose phases differ by $\pi/2$ one after another can be obtained from the light receiving elements 72e, 72f, 72g and 72h, and the directional senses of the displacements of the scales 24 and 26 along the Y axis and their relative displacements can also be detected in a similar way along the X axis.

As explained above, the directional senses and the lengths of displacements in the X and Y axes can be detected by the photoelectric encoder according to this embodiment. In this embodiment, the lattice portions 78 aligned in the row direction for detecting movements in the X direction and the lattice portions 78 aligned in the column direction for detecting movements in the Y direction have different pitches from each other. Namely, the scales in row direction are formed at a relatively rough pitch $P_1$ such that the movements in the X direction can be read at a high speed, while the scales in column direction are formed at a relatively fine pitch $P_1'$ such that the movements in the Y direction can be read at high resolution.

In this way, the pitches can be determined according to the movement characteristics of the mounting member 18. In addition, the lattices according to the pitches can be formed accurately by the same manufacturing method as the conventional one.

The following pitches are preferable:

$P_1 = 40$ μm (the length of the bright portion = the length of the dark portion = 20 μm)

$P_2 = 160$ μm (the length of the bright portion = 40 μm, the length of the dark portion = 120 μm)

$P_3 = 80$ μm (the length of the bright portion = the length of the dark portion = 40 μm)

$P_1' = 20$ μm (the length of the bright portion = the length of the dark portion = 10 μm)

$P_2' = 80$ μm (the length of the bright portion = 20 μm, the length of the dark portion = 60 μm)

$P_3' = 40$ μm (the length of the bright portion = the length of the dark portion = 20 μm).

When the pitch of the second lattice is made larger than that of the first lattice and the length of its light transparent portion is made not larger than the pitch of the first lattice in this way, the incoherency of the illuminating light which has passed through the second lattice is improved and the S/N of the detected signals is made high. Thus, the signals can be processed easily and the displacements can be detected at a high accuracy.

The following pitches are also preferable:

$P_1 = 100$ μm (the length of the bright portion = the length of the dark portion = 50 μm)

$P_2 = 400$ μm (the length of the bright portion = 100 μm, the length of the dark portion = 300 μm)

$P_3 = 200$ μm (the length of the bright portion = the length of the dark portion = 100 μm)

$P_1' = 40$ μm (the length of the bright portion = the length of the dark portion = 20 μm)

$P_2' = 160$ μm (the length of the bright portion = 40 μm, the length of the dark portion = 120 μm)

$P_3' = 80$ μm (the length of the bright portion = the length of the dark portion = 40 μm).

Further, the following pitches are preferable:

$P_1 = 20$ μm (the length of the bright portion = the length of the dark portion = 10 μm)

$P_2 = 20$ μm (the length of the bright portion = the length of the dark portion = 10 μm)

$P_3 = 20$ μm (the length of the bright portion = the length of the dark portion = 10 μm)

$P_1' = 10$ μm (the length of the bright portion = the length of the dark portion = 5 μm)

$P_2' = 10$ μm (the length of the bright portion = the length of the dark portion = 5 μm)

$P_3' = 10$ μm (the length of the bright portion = the length of the dark portion = 5 μm).

When the pitches of the first, second and third lattices are made equal and the lattice distance between the main scale 24 and the index scale 26 is set to be d and $$P_1 = 20 \mu m > P_1' = 10 \mu m$$

as is in this example, an X-Y encoder can be realized in which outputs vary little in spite of change of the lattice distance d between the main scale 24 and the index scale 26 by setting the lattice distance d to:

$$d \geq P_1^2 / 2\pi$$

where $\pi$ is an average wavelength of the light source (light emitting element) 70.

When $P_1 = P_1'$, either value of them can be adopted.

The feature of this structure are as follows:

(1) A signal of two pitches $P_1$ is output when the feed is made by one pitch $P_1$ in the X direction. Thus, a signal optically divided into two is obtained. This makes it easy to construct an electrical dividing circuit; and (2) since the variation of the lattice distance d causes little adverse effects, it is suitable for a system structure with a fine pitch $P_1$ or $P_1'$ not larger than 40 μm. Still further, the following pitches are preferable:

$P_1 = 40$ μm (the length of the bright portion = the length of the dark portion = 20 μm)

$P_2 = 80$ μm (the length of the bright portion = the length of the dark portion = 40 μm)

$P_3 = 80$ μm (the length of the bright portion = the length of the dark portion = 40 μm)

$P_1' = 10$ μm (the length of the bright portion = the length of the dark portion = 5 μm)

$P_2' = 10$ μm (the length of the bright portion = the length of the dark portion = 5 μm)

$P_3' = 10 \mu m$ (the length of the bright portion = the length of the dark portion = 5 $\mu m$).

When feed is carried out by one pitch in the X direction with this structure, an output signal of one pitch $P_1$ is produced. On the other hand, when feed is effected by one pitch $P_1'$, an output signal of two pitches $P_1'$ is produced. Thus, this structure is suitable for a high speed and low resolving power detection of the X-directional displacement and a low speed and high resolving power detection of the Y-directional displacement.

With the present invention, the first lattice 76 can be formed in a wide area so as to enlarge the detecting area. The shape of the first lattice 76 can be determined by considering the relative movement between the main scale and the index scale and the like. It is possible to form the matrix-shape land lattice as a transparent portion and form the portion 89, which is not a portion of the land, as a reflecting portion.

Figure 10:
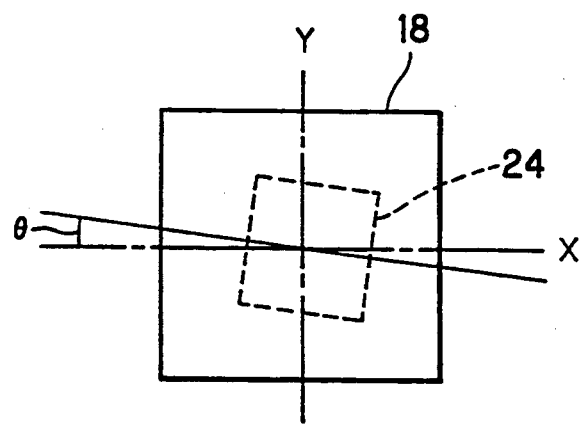
FIG. 10 is a view showing the positional displacement between the mounting member and the encoder.

When the X-Y encoder 20 is connected to the lower portion of the mounting member 18, the relative rotational angular position between the mounting member 18 and the main scale 24 of the X-Y encoder arises a problem. Consider the case where the X axis of the main scale 24 is inclined from the X axis of the mounting member 18, as shown in FIG. 10. This means that even if the mounting member 18 is moved only in the X direction, not only an X-directional output signal, but also a Y-directional output signal are produced. As described below, another embodiment of the present invention has means for adjusting the inclination between the mounting member 18 and the main scale 24.

Figure 11A:
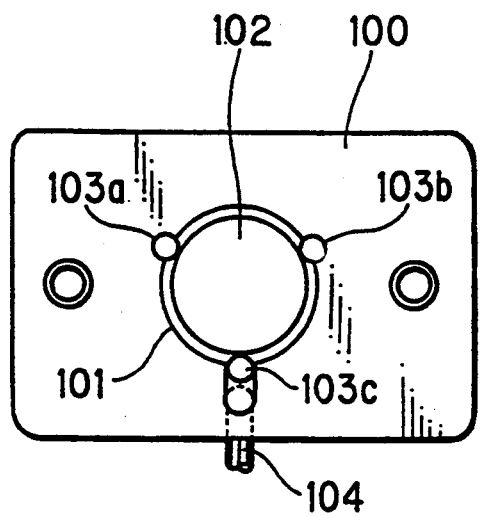
FIGS. 11A–11B are views of the structure of a positional displacement adjusting portion of the embodiment.
Figure 11B:
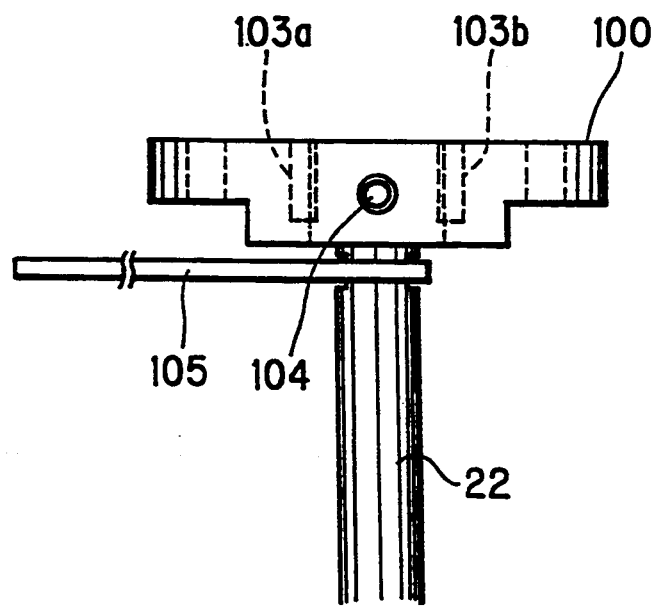

FIGS. 11A–11B show a plan view and a side view of a block 100 integrally provided on the mounting member 18 with a portion of a detecting shaft 22 of the X-Y encoder being fixed to the mounting portion 18, respectively. The block 100 is formed with a mounting hole 101 in which the distal portion 102 of the solid cylindrical detecting shaft 22 fixedly inserted. Previously embedded in the inner peripheral wall of the mounting hole 101 are three parallel pins 103a, 103b and 103c arranged at circumferential intervals of 120°. The two parallel pins 103a and 103b are fixedly mounted in the mounting hole 101 such that their inside portions extend inward from the peripheral wall of the mounting hole 101 over their length. The remaining pin 103c is movable radially in the mounting hole 101 with a play being provided between the pin 103c and the distal portion 102 of the detecting shaft, and can be pressed against the distal end portion 102 of the detecting shaft by means of a set screw 104 in mesh with a hole formed in the lateral wall of the block 100.

An adjusting lever 105 relatively rotatable with respect to the block 101 is mounted on the upper portion of the detecting shaft 22 to hold the same. The adjusting lever 105 is inserted from the outside of the X-Y table in a space defined between the mounting member 18 and the X-directional moving member 14 disposed under the mounting member 18 and is used to adjust the relative rotational angular position between the block 100 and the detecting shaft 22.

In this way, the block 100 is fixedly held on the distal end portion 102 of the detecting shaft 22 by means of the three parallel pins 103a to 103c forming a three-line support. In the concrete, the adjustment of the displacement of the rotational angles shown in FIG. 10 is made by rotating the detecting shaft 22 with respect to the block 100 by means of an adjusting lever 105 while the distal end portion 102 of the detecting shaft 22 is inserted in the mounting hole 101 and the parallel pin 103c is lightly pressed against the distal end portion 102 of the detecting shaft 22 by means of the set screw 104. During this adjustment, the center of rotation of the detecting shaft 22 is not deviated because it is supported by the three parallel pins 103a to 103c.

Figure 12:
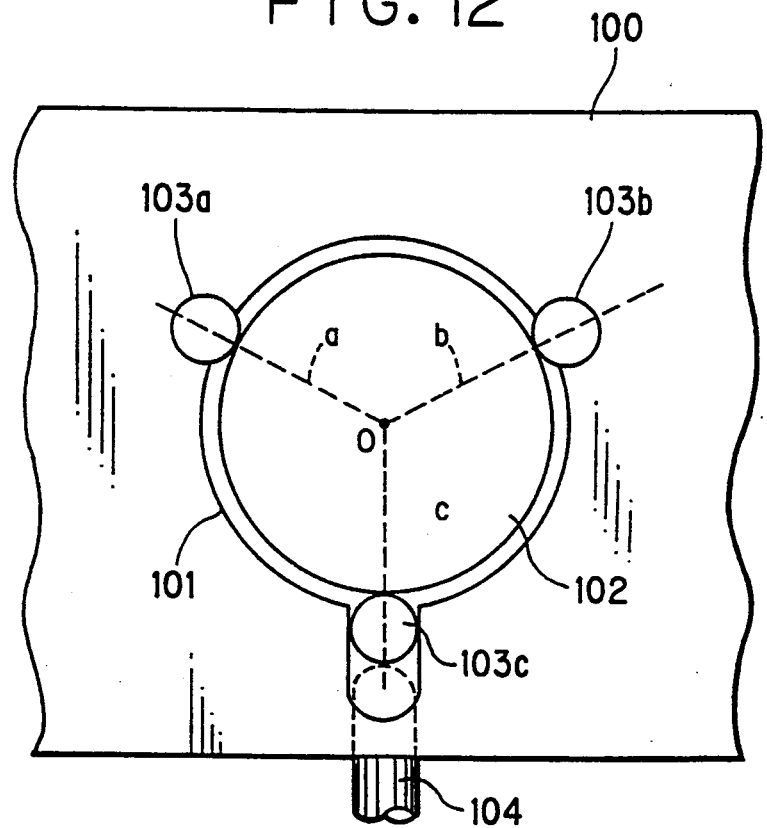
FIG. 12 is a view showing that the center of rotation is fixed, upon the adjustment of the positional displacement of the above-mentioned embodiment.

When the distal end portion 102 of the detecting shaft 22 is supported by the three parallel pins 103a to 103c as shown in an enlarged scale in FIG. 12, the perpendicular lines a, b and c to contact lines of the tangent columns of the parallel pins 103a to 103c and the distal end portion 102 of the detecting shaft 22 always coincide with each other on the center of rotation O of the distal end portion 102 of the detecting shaft 22. This is held true even if the gap between the mounting hole 101 of the block 100 and the distal end portion 102 of the detecting shaft 22 is uniform or not.

When the detecting shaft 22 is rotated with respect to the block 100 with this structure, the center of rotation Q is never deviated, facilitating extremely high relative positioning.

Figure 13:
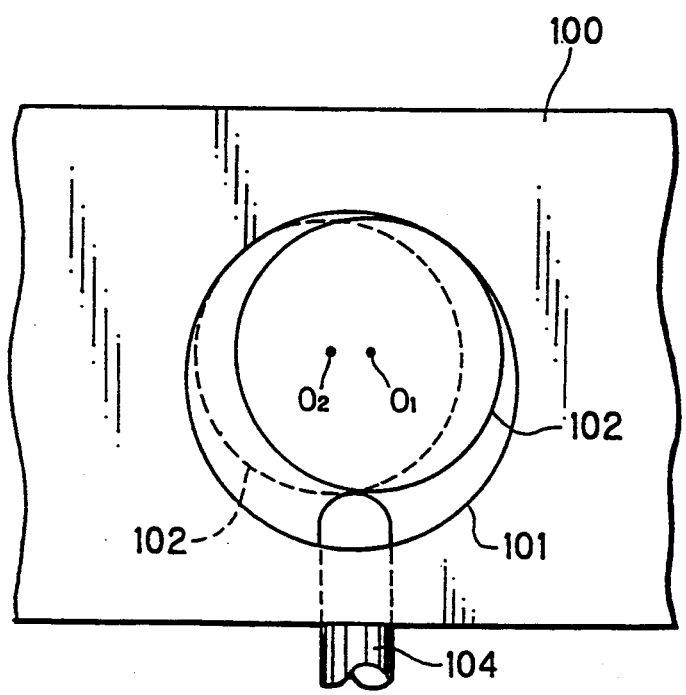
FIG. 13 is a view illustrating how the center of rotation deviates when it is fixed only by a set screw.

For reference, it is shown in FIG. 13 how out-of-adjustment occurs when distal end portion 102 of the detecting shaft is fixed to the mounting hole 101 only by means of the set screw 104, without using parallel pins. The center of the distal end portion 102 of the detecting shaft is located at $O_1$ when the distal end portion 102 is placed at the position shown by a solid line, but at $O_2$ when the distal end portion is placed at the position shown by a dot line. Therefore, the center of rotation is not determined when the distal end portion 102 is pressed only by the set pin 104. Thus, the relative rotational angel cannot be adjusted accurately.

It is not always necessary that the three parallel pins are arranged so as to be circumferentially separated from one after another by 120°. It may be enough that they are arranged such that, when the radially movable pin is pressed by the set screw, stress vector components are directed toward the two remaining fixed parallel pins.

In this embodiment, the block 100 for holding the detecting shaft of the encoder is integrally provided on the mounting member 18. Since the block 100 can be considered to be a part of the mounting member 18, however, the block 100 can be omitted in the present invention. The detecting shaft of the X-Y encoder may be hollow cylindrical instead of solid cylindrical.

As described above, the second embodiment of the present invention provides an X-Y table apparatus with which the table and the encoder can be positioned easily at a high accuracy when the X-Y encoder is assembled in the apparatus.

We claim:

1. An X-Y table apparatus characterized by comprising:
   a base;
   an X-directional moving member movable in X direction with respect to said base;
   a mounting member movable in Y direction with respect to said X-directional moving member and being capable of loading articles; and
   displacement detecting means for detecting displacements of said mounting member with respect to said base, said displacement detecting means comprising a main scale cooperatively arranged at the center of the rear surface of said mounting member and having a first matrix-shaped land lattice, and an index scale arranged in parallel with said main scale and movable in two-dimensional directions with respect to said main scale and having a second orthogonally crossing lattice and a third orthogonally crossing lattice.

2. The X-Y table apparatus according to claim 1, characterized in that said first lattice comprises a reflection type land lattice, and that in said index scale said second lattice of transparent cross type is provided on the central portion of said index scale, said third lattice of transparent type is provided on the outer peripheral portion of said second lattice, light emitting elements are provided on the rear face of said second lattice of transparent cross type, and a light receiving element is provided on the rear face of said third lattice of transparent type.

3. The X-Y table apparatus according to claim 2, characterized in that said first lattice has an X-directional pitch and a Y-directional pitch different from said X-directional pitch.

4. The X-Y table apparatus according to claim 2, characterized in that said second lattice has a larger pitch than said first lattice, and said second lattice includes a light transparent portion having a smaller length than said pitch of said first lattice.

5. The X-Y table apparatus according to claim 2, characterized in that said first to third lattices have the same pitch, and the distance d between said main scale and said index scale is set to:

$$d \geq P_1^2/2\pi$$

where $\lambda$ is an average wavelength of a light source.

6. An X-Y table apparatus characterized by comprising:
a base;
a first axially moving member provided so as to be movable in a first axial direction in a two-dimensional area with respect to said base;
a mounting member movable in a second axial direction in said two-dimensional area with respect to said first axially moving member, for loading articles;
an X-Y encoder having a solid cylindrical or hollow cylindrical detecting shaft connected to a mounting hole formed in said mounting member, and a main scale and an index scale disposed opposed to each other, one of said main and index scales being fixed to said base, for detecting displacements of said base in said first and second directions simultaneously; and
adjusting means comprising three parallel pins provided in said mounting hole of said mounting member so as to partially project from the inner peripheral wall of said mounting hole, said three parallel pins defining three lines for supporting said detecting shaft, and a lever for rotating said detecting shaft and adjusting a relative rotational angular position between said mounting member and said X-Y encoder.

* * * * *